United States Patent [19]

Parisi

[11] 3,742,353

[45] June 26, 1973

[54] FREQUENCY MEASURING APPARATUS INCLUDING PHASE-LOCKED LOOP

[75] Inventor: Frank E. Parisi, Waltham, Mass.

[73] Assignee: Parisi Associates, Inc., Waltham, Mass.

[22] Filed: Sept. 27, 1971

[21] Appl. No.: 183,986

[52] U.S. Cl. .................................. 324/79 D, 324/82

[51] Int. Cl. ......................... G01r 23/14, G01r 23/00

[58] Field of Search ................ 324/75, 82; 328/140, 328/134; 329/122; 325/329, 419, 420

[56] References Cited

UNITED STATES PATENTS 3,331,025 7/1967 Rameau .............................. 325/419

*Primary Examiner*—Alfred E. Smith
*Attorney*—Charles Hieken

[57] ABSTRACT

The frequency of a received r-f input signal is accurately measured over a wide dynamic range synchronously detecting the signal with a superheterodyne receiver at intermediate frequency, phase locking the i-f signal to that of a reference signal, applying this reference signal to a frequency doubler whose output is applied to the modulating input of a balanced modulator energized on its carrier input by the output of another frequency doubler that doubles the frequency of the same local oscillator that is mixed with the input signal to provide the intermediate frequency signal. The output of the balanced modulator may then be applied to a tuned amplifier which provides as an output a signal of frequency exactly twice the frequency of the input signal that may then be conveniently measured, such as with a counter. The apparatus includes a phase-locked loop that adjusts the frequency of the local oscillator so that the input signal is beat down exactly to the intermediate frequency.

2 Claims, 1 Drawing Figure

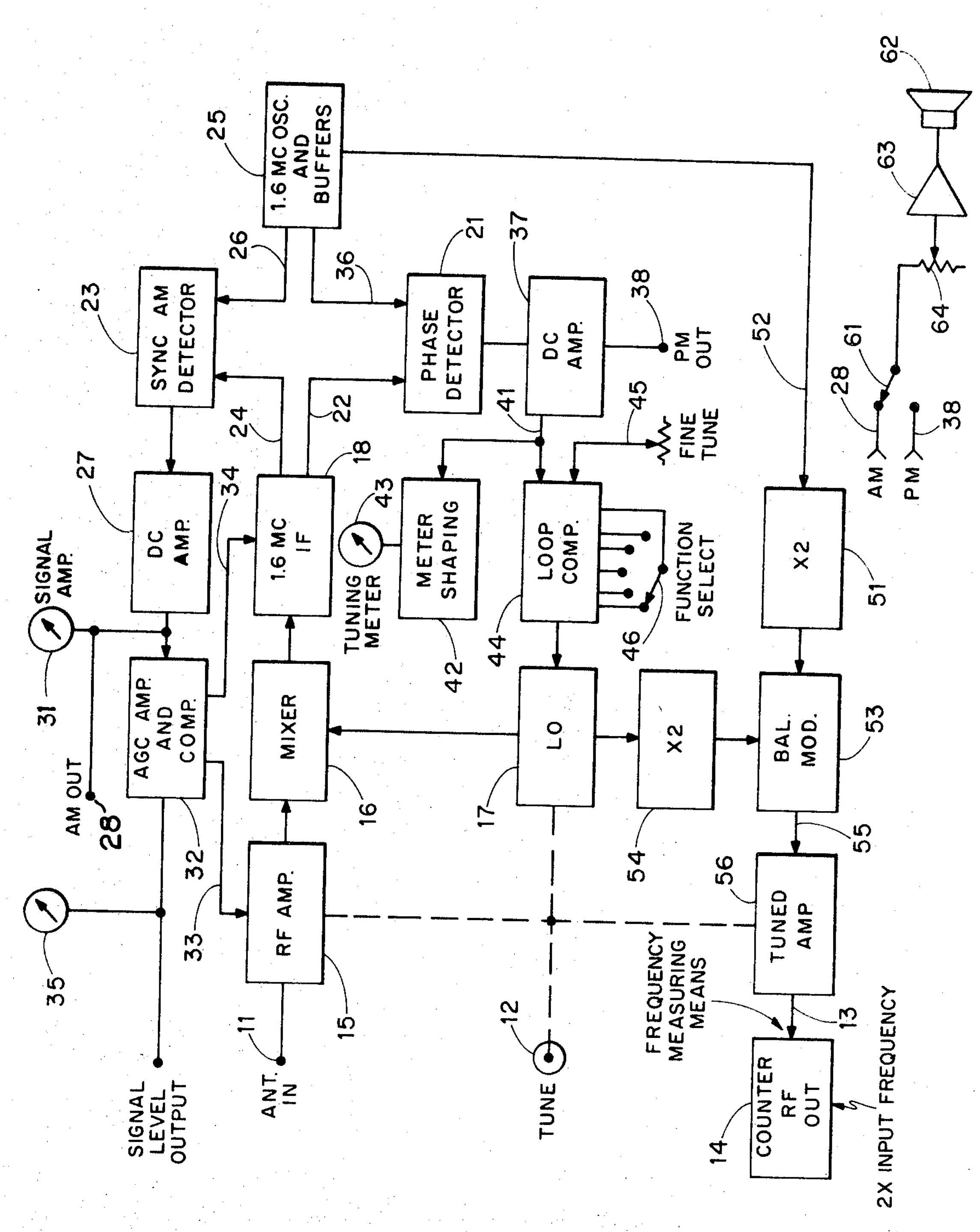
INVENTOR
FRANK E. PARISI
BY Charles Hieken
ATTORNEY

FREQUENCY MEASURING APPARATUS INCLUDING PHASE-LOCKED LOOP

BACKGROUND OF THE INVENTION

The present invention relates in general to frequency measuring and more particularly concerns novel apparatus and techniques for accurately measuring the frequency of input signals that may vary over a wide dynamic range. The invention is also useful for checking the accuracy of a counter when the received signal is of known precise frequency, such as WWV.

It is an important object of this invention to accurately measure the frequency of a received input signal.

It is a further object of the invention to achieve the preceding object over a relatively wide range of input signal frequencies.

It is a further object of the invention to achieve one or more of the preceding objects over a relatively wide dynamic range of input signals.

It is a further object of the invention to achieve one or more of the preceding objects with reliable apparatus that facilitates direct readout of the frequency being measured.

SUMMARY OF THE INVENTION

According to the invention, there is a receiver having a mixer and an intermediate frequency amplifier. A source of a fixed frequency signal of intermediate frequency is compared with the output of the intermediate frequency amplifier in a phase detector to provide a phase locking signal that locks the phase of the local oscillator to that of the input signal so that the output of the intermediate frequency amplifier corresponds to intermediate frequency. The source of the fixed intermediate frequency signal is applied to a first frequency multiplier. The output of the local oscillator, in addition to being applied to the receiver mixer, is applied to a second frequency multiplier to multiply the frequency of the local oscillator signal by the same factor by which the first multiplier multiplies the fixed intermediate frequency signal. The output of the first and second frequency multipliers are applied to a balanced modulator to provide an output signal that is the frequency of the input signal multiplied by the same factor. Measuring means, such as a counter, may then count this signal to provide an accurate indication of the frequency of the input signal, regardless of how weak the input signal is.

Numerous other features, objects and advantages of the invention will become apparent from the following specification when read in connection with the accompanying drawing.

BRIEF DESCRIPTION OF THE DRAWING

The single FIGURE of which is a block diagram illustrating the logical arrangement of a system according to the invention.

DETAILED DESCRIPTION OF PREFERRED EMBODIMENTS

With reference now to the drawing, there is shown a block diagram illustrating the logical arrangement of a frequency measuring receiver according to the invention. A received signal on antenna input terminal 11 is selected by tuning knob 12 to provide a signal of twice the frequency on output line 13 that is counted by counter 14 to accurately measure the frequency of the signal on terminal 11 selected by tuning knob 12 over a wide dynamic range. The system includes an r–f amplifier 15 energizing a mixer 16 that mixes the local oscillator signal from local oscillator 17 with the received signal to provide an intermediate frequency signal that is amplified by i–f strip 18 to provide an i–f signal that is applied to phase detector 21 on line 22 and to synchronous a–m detector 23 on line 24. Synchronous a–m detector 23 also receives a fixed frequency signal from oscillator and buffer 25 of the intermediate frequency, typically 1.6 MHz, on line 26.

D–c amplifier 27 amplifies the detected a–m signal from synchronous a–m detector 23 to provide the a–m signal on terminal 28 that may be further amplified or utilized. D–c amplifier 27 may also energize signal amplitude meter 31 to provide a measure of the amplitude of the detected signal.

Agc amplifier and compensator 32 receives the amplified a–m signal from d–c amplifier 27 and provides AGC signals on lines 33 and 34 to r–f amplifier 15 and i–f strip 18, respectively, to maintain the output amplitude of d–c amplifier 27 relatively constant. AGC amplifier and compensator 32 also energizes signal level meter 35 to provide an indication of the signal strength.

Phase detector 21 also receives a fixed frequency i–f reference signal from reference oscillator and buffer 25 on line 36 to provide a signal that is amplified by d–c amplifier 37 to provide a phase modulated signal on terminal 38. D–c amplifier 37 also provides a signal on line 41 that is applied to tuning meter 43 through meter shaping circuit 42 to facilitate accurate tuning, the meter typically reading zero when a station is accurately tuned in. The signal on output line 41 is also applied to loop compensating circuit 44 to help control the frequency of local oscillator 17 so that the selected input signal produces an i–f signal that is in phase synchronism with the reference signal provided by oscillator and buffer 25.

A potentiometer 45 helps initially adjust the potential provided by loop compensation circuit 44 so that local oscillator 17 assumes a phase that results in the i–f signal at the output of i–f strip 18 locking to oscillator 25. Function selector switch 46 functions to modify the amplitude and frequency response of the loop compensation to modify the performance in the presence of various possible types of modulation of the signal.

A first frequency doubler 51 receives the fixed frequency signal from oscillator and buffers 25 on line 52 to provide a signal of twice the i–f frequency to the signal input of balanced modulator 53. A second frequency doubler 54 doubles the local oscillator frequency provided by local oscillator 17 to provide twice local oscillator frequency on the carrier input of balanced modulator 53 that provides as an output on line 55 to tuned amplifier 56 a signal of frequency twice the selected input signal frequency on terminal 11. Tuned amplifier 56 provides this amplified signal on output 13 to counter 14 that provides an accurate indication of the frequency of selected signal on terminal 11.

A selector switch 61 permits selection of the a–m signal on terminal 28 or the p–m signal on 38 for listening on loudspeaker 62 after amplification by audio amplifier 63 through volume control 64.

Tuning knob 12 is mechanically linked to r–f amplifier 15, local oscillator 17 and tuned amplifier 56.

The circuitry in the different blocks is well known in the art and details are omitted here to avoid obscuring the principles of the invention.

Having described the physical operation of the circuit, the principles of operation will be described briefly. The invention solves the difficult problem of being able to conveniently and reliably measure the frequency of input signals over relatively wide dynamic ranges. The problem is especially difficult in connection with accurately measuring the frequency of weak signals. Accurately measuring a frequency is facilitated by converting the low level input signal into a much higher level signal. Serious problems would be presented if the stronger signal were of the same frequency as the weaker signal because sensitive circuits responding to the weak signals might also respond to the strong signal inside the receiver of the same or nearly the same frequency. This problem is avoided by having the strong signal that is counted a multiple of the input signal frequency and well outside the frequency range to which the sensitive input portion of the receiver is tuned. Another feature of the invention resides in locking the received intermediate frequency signal to the phase of the fixed i–f frequency source. It is relatively easy to provide a very stable fixed frequency source at this low frequency. The apparatus as a whole thus facilitates receiving signals with a sensitive stable receiver, monitoring what is received and accurately identifying the input signal frequency.

There has been described an especially useful frequency measuring monitoring receiver. It is evident that those skilled in the art may now make numerous uses and modifications of and departures from the specific embodiments described herein without departing from the invention concepts. Consequently, the invention is to be construed as embracing each and every novel feature and novel combination of features present in or possessed by the apparatus and techniques herein disclosed and limited solely by the spirit and scope of the appended claims.

What is claimed is:

1. Frequency measuring apparatus comprising, an input terminal for receiving over a predetermined band of frequencies an input signal whose frequency is to be measured, a source of a local oscillator signal, means for mixing the signal on said input terminal with said local oscillator signal to provide an i–f signal of different frequency, a source of a fixed frequency reference substantially at said difference frequency, phase detecting means responsive to said i–f signal and said reference signal for providing an error signal representative of the phase difference therebetween, means for applying said error signal to said local oscillator to maintain said i–f signal substantially locked in phase to said reference signal, means for multiplying the frequencies of said local oscillator and reference signals by the same integral multiple different from one, and means for mixing the latter multiplied signals to provide a signal of frequency outside said predetermined band of frequencies that is said multiple of the frequency of the signal on said input terminal that is mixed to provide said i–f signal.

2. Frequency measuring apparatus in accordance with claim 1 and further comprising means for counting the frequency of the latter signal.

* * * * *